Figure 1:
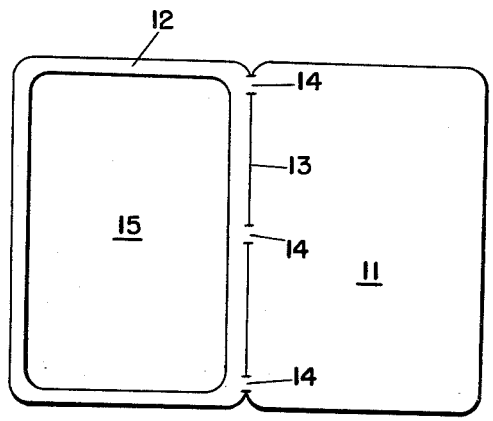

April 10, 1962  R. F. DE LONG  3,029,149
MEAT PACKAGE

Filed April 7, 1960  2 Sheets-Sheet 1

April 10, 1962 R. F. DE LONG 3,029,149
MEAT PACKAGE

Filed April 7, 1960 2 Sheets-Sheet 2

# United States Patent Office 3,029,149
Patented Apr. 10, 1962

3,029,149
MEAT PACKAGE
Robert F. De Long, Neenah, Wis., assignor to American Can Company, Jersey City, N.J., a corporation of New Jersey
Filed Apr. 7, 1960, Ser. No. 20,627
3 Claims. (Cl. 99—174)

This invention relates to the art of food packaging, and more particularly to a package for raw, red meat wherein the freshness and particularly the desirable red color associated with fresh meat are retained over an extended period of time.

The package of the present invention is specifically constructed to preserve the color, flavor and freshness of raw, red meat therein enclosed, to prevent contamination of the packaged product and at the same time to display the meat most advantageously to visual inspection from all sides except that on which the product rests. All of these factors are of importance in the merchandising of a fresh, rapidly perishable product such as raw red meat.

When raw meat such as beef, veal and, to a lesser degree, lamb, is freshly cut, the cut surfaces display a dark, almost purplish color which is due largely to the presence of myoglobin. Since myoglobin, upon exposure to air, rapidly oxygenates to give the characteristic rich red resulting from the presence of oxymyoglobin, and since this color change occurs within a matter of a very few minutes, the red, oxymyoglobin color is that which is generally associated in the minds of the consuming public with freshly cut meat.

Upon more prolonged exposure to air, particularly in the presence of light or under dessicating conditions, the red oxymyoglobin becomes oxidized to form metmyoglobin and the meat assumes a brown color and simultaneously degenerates in flavor and texture. The brown color of metmyoglobin is therefore associated by the public with old and stale cuts of meat.

It is the object of this invention to provide a package for consumer size cuts of raw, red meat which will preserve the freshness, flavor and color of the packaged product for extended periods of time, thereby reducing loses due to the unsaleability of stale meat products.

It is a further object to provide a packaging medium for raw, red meat which may be filled and sealed rapidly and conveniently at the retail level and which will attractively display the product to the greatest practical degree to the inspection of the prospective customer.

Other objects will become apparent from the following description.

The invention generally comprises a one piece paperboard carton blank having two connected panels of equal size and similar contour, one of which has a cut-out portion which constitutes a display window. The entire blank including the window area is lined with a transparent, thermoplastic film having certain permeability and extensibility characteristics as will be hereinafter detailed. The film liner is adhered to the paperboard carton blank only along all of the marginal areas of each of the panels, those portions of the liner which will be in contact with the meat product to be packaged being unadhered to the paperboard.

In filling the package, the transparent film which forms the window portion is uniformly stretched or deformed to form a pocket in which the meat is placed, the solid base panel is folded back along the hinge score line connecting the two panels so that it covers the meat and overlies the window-containing closure panel, and the two panels are sealed together with heat and pressure around all of their coincident marginal areas.

Figure 2:
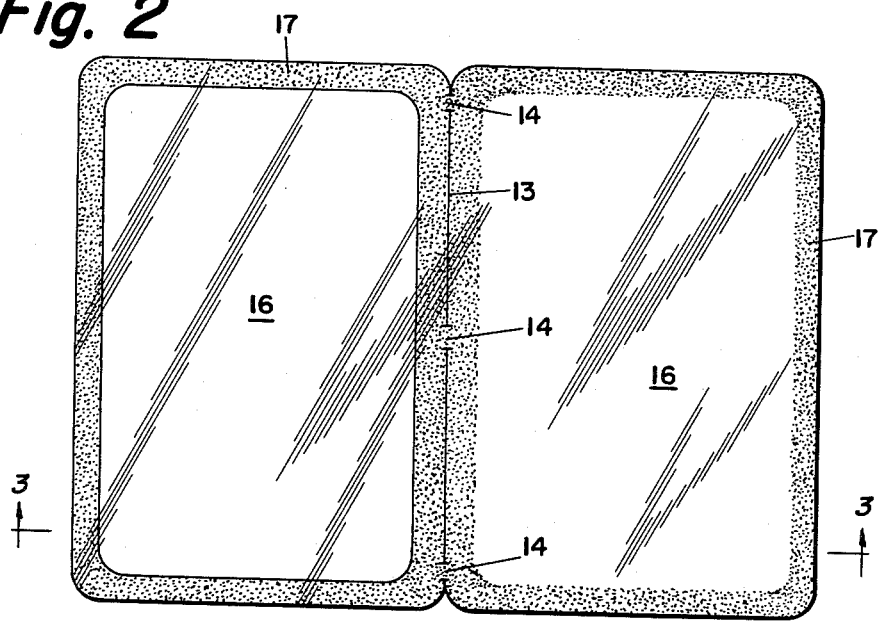
Figure 3:
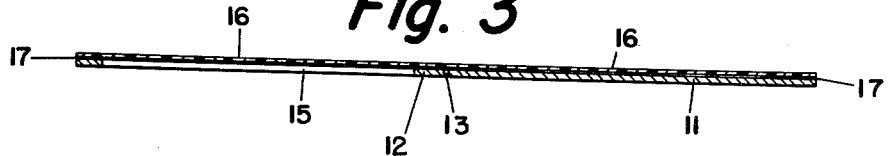
Figure 4:
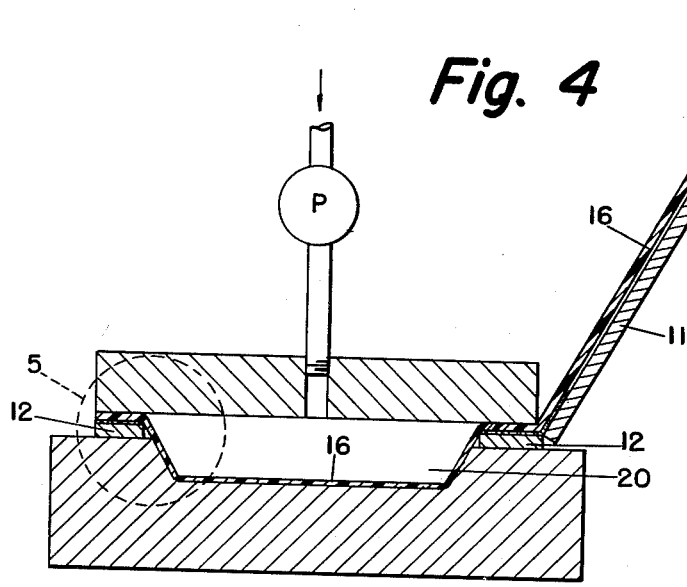
Figure 5:
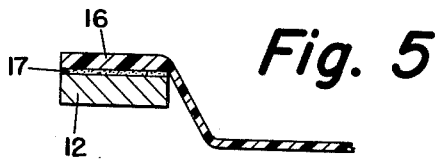
Figure 7:
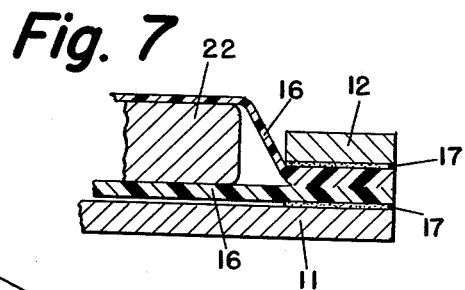
Figure 6:
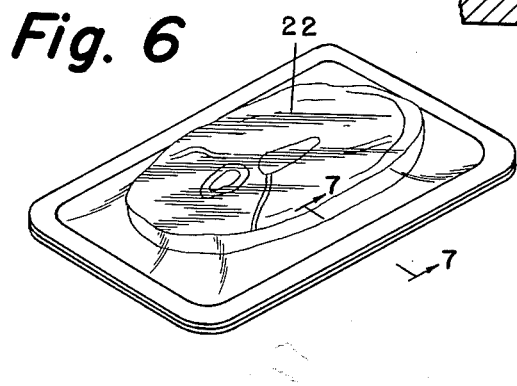

The invention will be clearly understood by reference to the following detailed specification taken in conjunction with the accompanying drawings, in which:

FIGURE 1 is a plan view of a paperboard carton blank of preferred form from which the carton of the present invention may be formed, FIGURE 2 is a plan view of a similar paperboard carton blank to which a transparent, thermoplastic film liner has been adhered by applicaiton of a suitable adhesive in specified areas of the carton, FIGURE 3 is a cross-sectional view taken along line 3—3 of FIGURE 2, FIGURE 4 is a cross-sectional view of the carton positioned in a suitable apparatus, schematically represented, by which a portion of the film liner is stretched to form a pocket wherein the product to be packaged may be placed, FIGURE 5 is an enlarged view of a portion of the carton as shown in FIGURE 4 within the circle 5, FIGURE 6 is a perspective view of the completed, product-containing package, and FIGURE 7 is an enlarged cross-sectional view along line 7—7 of FIGURE 6.

Referring to the drawings, the paperboard carton blank shown in FIGURE 1 comprises a base panel 11 and a cover or closure panel 12 connected along a centrally located transverse hinge line 13 which may be in the form of a simple score line, a line of perforations, a cut score line or, as shown in the drawings, a cut line interrupted by a number of uncut hinge areas 14. Panels 11 and 12 are of similar size and contour so that, when the carton is folded about hinge line 13, the two panels may be superposed one on the other with their peripheral edges substantially coincident. Cover panel 12 contains an internal cut-out portion 15 which serves as a display or window area.

As shown in FIGURES 2 and 3, the entire inside surface of the carton blank, including the cut-out area 15, is lined with a transparent, flexible and extensible thermoplastic film, generally designated by number 16. The film liner is adhered to the paperboard blank by a suitable adhesive 17, applied only in the marginal area of the base panel and in the marginal area of the cover or closure panel outside the window area.

It is essential that the adhesive be restricted to the marginal areas of the base panel so that, although the film liner 16 is firmly adhered to the base panel around its entire margin, the main central area of the base panel is free of adhesive and in this latter area the film liner is merely superimposed on, but not adhered to, the base carton panel 11.

In preparing the filled and sealed meat package, the portion of the film liner 16 covering the window portion 15 of the carton is first stretched to form a pocket or chamber of sufficient size to contain the meat which is to be packaged. The carton is positioned for the pocket-forming operation by placing the portion of the film 16 covering the window area 15 of the carton over a chamber 20 of the desired size and contour while the marginal portions of the cover panel 12 are restrained in position on the shoulder areas surrounding the chamber. While the carton is restrained in this position, the film may be stretched to form a pocket by reducing the air pressure on the outer face of the film or by applying increased air pressure to the inner film face as represented in FIGURE 4. In some cases it may be desirable to warm the film somewhat to facilitate the stretching operation but if films having the preferred characteristics are utilized, the deformation by vacuum or pressure to form the pocket for the meat product may be accomplished at room temperature without the necessity of applying heat to the film liner. The meat 22 may thereafter be placed in the film pocket so formed, the base panel 11 folded over along hinge line 13 to lie in covering relation to the cover panel 12 and the meat product 22 and the package may then be sealed by the application of heat and pressure to the entire marginal areas, sealing being obtained through the medium of the thermoplastic film liner.

To be satisfactory for use in the present invention, the sheet material forming the film liner of the package must exhibit certain specified characteristics. The film must be thermoplastic so that it will seal to itself under the influence of heat and pressure and must be uniformly extensible to the degree necessary to form a pocket area for the product to be packaged without rupture of the film material. To be considered uniformly extensible, a film should stretch evenly over essentially the entire area to which stress is applied without appreciable formation of local thin spots which cause localized rupture. The uniform stretching of the film to form the pocket area is shown in FIGURE 4 and in FIGURE 5, the resulting decrease in thickness of the film in the pocket area being somewhat exaggerated in the drawings for the sake of clarity. In general, a uniform two-dimensional extensibility of 100% or more without rupture has proven satisfactory for my use. That is, a film which may be uniformly stretched to at least double its original length or width without rupturing will be satisfactory. In addition, the permeability of the film to oxygen gas must be relatively high while its permeability to water vapor must be relatively low. Permeability of a one mil film to water vapor should not exceed about 200 grams per square meter per 24 hours in standard permeability testing equipment, while the permeability to air or oxygen gas should be as least 1000 cubic centimeters per square meter per 24 hours as measured by standard permeability testing equipment, the optimum permeability to air and oxygen ranging from about 1000 cc. to 5000 cc. per square meter per twenty four hours. Transparency of the film is, of course, highly desirable, although a moderate degree of translucency may be tolerated if other characteristics are satisfactory.

Films which have proven particularly satisfactory as components of the package of my invention are 80 to 120 gauge (0.8 to 1.2 mils in thickness) rubber hydrochloride film and similar gauge film made of polyvinyl chloride. These films have permeabilities to air or oxygen of from 1000 to 3000 cc. per square meter per 24 hours and a permeability to water vapor of from 100 to 200 grams per square meter per 24 hours.

The paperboard sheet material from which the base panel of the package is constucted should have a permeability to oxygen very substantially in excess of that of the film liner so that oxygen will pass relatively freely through the base panel. Ordinary uncoated paperboard has a permeability to air and oxygen ranging from about 50 up to more than 1000 times that of the films previously discussed and is quite satisfactory for the purpose. In general, such paperboard will have a permeability to air ranging upward from 50 liters per square meter per 24 hours under standard test conditions. It must be emphasized, however, that the pores normally present in paperboard must not be closed by a coating or adhesive applied in those areas upon which the portion of the liner contacting the meat product are superimposed, for if this be the case, insufficient oxygen will pass through the package walls to maintain the desired red color of the enclosed meat product. For this reason, the film liner is not adhered to the paperboard base in the meat-supporting area, but only in the marginal areas lying outside of the area covered by the meat product.

It hae been found that if the liner is laminated to the base panel by an adhesive applied in the area to be covered by the meat product, the meat enclosed in the completed package will, in the course of a few hours, attain a brown color in the areas in contact with the laminated sheet. This brown color will not revert to the characteristic red color of fresh meat on exposure of the meat to atmospheric oxygen, and creates a very unfavorable opinion in the mind of the customer as to the quality of the meat product. By contrast, if the film liner is left unadhered to the base panel in the central, meat supporting area, the meat in contact with this area will retain the same desirable and attractive rich red color as that shown by the portions of the meat which are covered only by the film liner and exposed to customer inspection through the window areas of the package.

Meat displayed for sale in the package of the present invention has been found to have substantially increased shelf-life over comparable meat displayed in conventional packages, retaining its freshness, flavor and attractive red color for as much as 75 to 100% longer than conventionally packaged meat, thus resulting in substantial economies in the marketing of fresh, raw red meat. In addition to the excellent product protection which it affords, the package provides superior product display and handling characteristics.

Various modifications may be made in the package construction without departing from the spirit of my invention and such modifications are intended to be included within the scope of the appended claims.

I claim:

1. A food package comprising raw red meat sealed in a display container comprising a supporting base for said meat, said base being made of flexible paperboard having a permeability to air of at least 50 liters per square meter per 24 hours, a closure panel hinged to said base, said closure panel having the same contour and dimensions as said supporting base, said closure panel being provided with a cut-out window, said base and closure panel including the window being completely lined with a transparent flexible heat-sealable film having a permeability to water vapor of less than 200 grams per square meter per 24 hours and a permeability to air of at least 1000 cubic centimeters per square meter per 24 hours and uniformly extensible under stress to at least double its original dimensions, said transparent film being adhesively secured to all the margins of said base and all the margins of said closure panel, said closure panel being folded over and covering said base and the meat supported thereon, all the superposed margins of said closure panel being heat-sealed to the contacting margins of said base, the meat-supporting area of said transparent film being adhered to said base and being larger in area than the contacting surface of the meat supported thereon, the red color of said meat on all surfaces including the supporting surface being stabilized for a substantial period of time by the effective passage of air through the walls of the package.

2. A food package comprising raw, red meat sealed in a display container comprising a supporting base for said meat, said base being made of flexible paperboard having a permeability to air of at least 50 liters per square meter per 24 hours, a closure panel hinged to said base, said closure panel having the same contour and dimensions as said supporting base, said closure panel being provided with a cut-out window, said base and closure panel including the window being completely lined with a rubber hydrochloride film having a permeability to water vapor of less than 200 grams per square meter per 24 hours and a permeability to air of at least 1000 cubic centimeters per square meter per 24 hours, said rubber hydrochloride film being adhesively secured to all the margins of said base and all the margins of said closure panel, said closure panel being folded over and covering said base and the meat supported thereon, all the superposed margins of said clousre panel being heat-sealed to the contacting margins of said base, the meat-supporting area of said rubber hydrochloride film being unadhered to said base and being larger in area than the contacting surface of the meat supported thereon, the red color of said meat on all surfaces including the supporting surface being stabilized for a substantial period of time by the effective passage of air through the walls of the package.

3. A food package comprising raw, red meat sealed in a display container comprising a supporting base for said meat, said base being made of flexible paperboard having a permeability to air of at least 50 liters per square meter per 24 hours, a closure panel hinged to said base, said closure panel having the same contour and dimensions as said supporting base, said closure panel being provided with a cut-out window, said base and closure panel including the window being completely lined with a polyvinyl chloride film having a permeability to water vapor of less than 200 grams per square meter per 24 hours and a permeability to air of at least 1000 cubic centimeters per square meter per 24 hours, said polyvinyl chloride film being adhesively secured to all the margins of said base and all the margins of said closure panel, said closure panel being folded over and covering said base and the meat supported thereon, all the superposed margins of said closure panel being heat-sealed to the contacting margins of said base, the meat-supporting area of said polyvinyl chloride film being unadhered to said base and being larger in area than the contacting surface of the meat supported thereon, the red color of said meat on all surfaces including the supporting surface being stabilized for a substantial period of time by the effective passage of air through the walls of the package.

References Cited in the file of this patent
UNITED STATES PATENTS

| | | |
|---|---|---|
| 2,736,656 | Marshall | Feb. 28, 1956 |
| 2,900,259 | Snyder et al. | Aug. 18, 1959 |
| 2,963,215 | Saidel et al. | Dec. 6, 1960 |

UNITED STATES PATENT OFFICE
CERTIFICATE OF CORRECTION

Patent No. 3,029,149                                   April 10, 1962

Robert F. De Long

It is hereby certified that error appears in the above numbered patent requiring correction and that the said Letters Patent should read as corrected below.

Column 4, line 45, for "adhered" read -- unadhered --.

Signed and sealed this 18th day of August 1964.

(SEAL)
Attest:

ERNEST W. SWIDER
Attesting Officer

EDWARD J. BRENNER
Commissioner of Patents